(12) United States Patent
Ghanime et al.

(10) Patent No.: US 8,657,714 B1
(45) Date of Patent: Feb. 25, 2014

(54) JOURNAL BEARING AND METHOD OF FACILITATING HYDRODYNAMIC OIL FLOW, LOAD CAPACITY AND OPTIMIZATION OF BEARING PERFORMANCE

(71) Applicant: General Electric Company, Schenectady, NY (US)

(72) Inventors: George Hanna Ghanime, Ballston Spa, NY (US); Darren Lee Hallman, Niskayuna, NY (US); Christina Paige Twist, Chicago, IL (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/630,116

(22) Filed: Sep. 28, 2012

(51) Int. Cl.
*F16H 57/04* (2010.01)
*F16N 1/00* (2006.01)

(52) U.S. Cl.
USPC .......................................... 475/159; 384/380

(58) Field of Classification Search
USPC ....................................................... 475/159
See application file for complete search history.

(56) References Cited

U.S. PATENT DOCUMENTS

| | | | | |
|---|---|---|---|---|
| 4,719,818 A | * | 1/1988 | McCreary | 475/159 |
| 4,721,016 A | | 1/1988 | Burandt | |
| 4,834,559 A | * | 5/1989 | Kalvoda | 384/118 |
| 5,102,379 A | * | 4/1992 | Pagluica et al. | 475/331 |
| 5,391,125 A | * | 2/1995 | Turra et al. | 475/346 |
| 5,567,056 A | * | 10/1996 | Blase et al. | 384/286 |
| 5,685,797 A | | 11/1997 | Barnsby et al. | |
| 6,814,684 B2 | | 11/2004 | Schulz et al. | |
| 7,527,577 B2 | | 5/2009 | Dalenberg et al. | |
| 7,662,059 B2 | * | 2/2010 | McCune | 475/159 |
| 7,883,438 B2 | * | 2/2011 | McCune | 475/159 |
| 7,954,395 B2 | | 6/2011 | Ishii | |
| 8,187,133 B2 | * | 5/2012 | Deutsch et al. | 475/159 |
| 8,298,108 B2 | * | 10/2012 | Nishida et al. | 475/159 |
| 8,398,517 B2 | * | 3/2013 | McCune et al. | 475/159 |
| 8,491,435 B2 | * | 7/2013 | Ghanime et al. | 475/159 |

OTHER PUBLICATIONS

Singh et al., "Internal Gear Strains and Load Sharing in Planetary Transmissions—Model and Experiments", Proceedings of the ASME 2007 International Design Engineering Technical Conferences & Computers and Information in Engineering Conference, pp. 1-12, Sep. 2007.

Xing et al., "Determining Wind Turbine Gearbox Model Complexity using Measurement Validation and Cost Comparison", National Renewable Energy Laboratory, pp. 1-12, Apr. 2012.

(Continued)

Primary Examiner — Dirk Wright
(74) Attorney, Agent, or Firm — John P. Darling

(57) ABSTRACT

A journal bearing for use in an epicyclical gearbox including a journal pin, a journal bearing body into which the journal pin is disposed and at least one lubricating fluid inlet. The lubricating fluid inlet is configured to provide for an input of a lubricating fluid in a loaded arc portion proximate at least one high pressure point exerted upon the journal bearing body during a high pressure event, thereby permitting a free flow of a lubricating fluid there between the journal pin and the journal bearing body during the high pressure event. In an embodiment, the journal pin is configured to mimic the shape of the journal bearing body at least at a high pressure point exerted upon the journal bearing body during a high pressure event. An epicyclical gearbox including the journal bearing and method of facilitating a hydrodynamic oil flow in the planet gear journal bearing.

20 Claims, 8 Drawing Sheets

(56) References Cited

OTHER PUBLICATIONS

Kissling et al., "An Algorithm for Robust Gear Modifications Design", Gear Solutions, Jul. 2012.
Keller et al., "Gearbox Reliability Collaborative Phase 1 and 2: Testing and Modeling Results", National Renewable Energy Laboratory, pp. 1-11, Sep. 2012.
Halse et al., "Sharing Innovation in Bearing, Gearbox & Driveline", Romax Technology, pp. 1-22, 2012.
Ghanime, George Hanna et al.; "Journal Bearing for Use in Epicyclical Gearbox and Method of Facilitating Hydrodynamic Oil Flow in the Journal Bearing"; Pending U.S. Appl. No. 13/218,790, filed Aug. 26, 2011; 25 Pages.

* cited by examiner

JOURNAL BEARING AND METHOD OF FACILITATING HYDRODYNAMIC OIL FLOW, LOAD CAPACITY AND OPTIMIZATION OF BEARING PERFORMANCE

BACKGROUND

The present application relates generally to journal bearings for use in gearboxes and more particularly relates to a journal bearing design for facilitating hydrodynamic oil flow, bearing load capacity and optimization of bearing performance.

Gearboxes are used for power transmission in many systems such as, wind turbines, automobiles, aircraft and locomotives. A gearbox typically includes components such as a housing, shafts, bearings, and gears. Various gearbox designs are available to meet different speed transmission requirements. Of concern herein are epicyclical gear systems consisting of one or more outer gears, or planet gears, revolving about a central, or sun, gear.

Generally, epicyclical gearboxes are characterized as star-type, planetary type or differential type. In a star type gearbox, the carrier and bearing journal pin are fixed and the input torque/speed is through a sun gear shaft. The output torque/speed is through a ring gear and vice versa. In one particular example, it is known to use a star-type epicyclical gearbox in an aircraft to drive aircraft engine accessories in response to rotation of a rotor. It is also known that the planet gears of such a gearbox, are typically formed having a thin-rim. These thin-rimmed planet gears and the bearings associated therewith, are subjected to high loads and thus suffer from high rates of wear under such demanding usage and do not provide ready accessibility for the maintenance, repair and replacement of these key wear components. More particularly, analysis, testing and understanding of the behavior of a highly-loaded thin-rimmed planet gear in a planetary gearbox has revealed an undesired behavior in the form of high planet gear distortion that negatively influences the performance of a planet-pin operation and may lead to bearing seizure and failure.

Gears, bearings, and shafts in a gearbox may have defects, may fail over time, or may simply wear out. These damaged or worn components may be replaced after the damaged or worn condition is detected. However, taking a gearbox out of service for such replacement typically results in revenue loss. Any failure of individual components affects the residual useful life (RUL) of the gearbox. Of particular interest with regard to maintenance of star-type epicyclical gearboxes is the flow of hydrodynamic oil within the gearbox bearings, especially under high-load distortion instances, that serves to minimize or eliminate wear to the component parts. A lack of hydrodynamic lubricating fluid flow between the body of each of the bearings and the associated journal pin may result in a lack of lubrication within the bearing and planet gear that may result in direct contact between the journal pin and the journal bearing body. This direct contact may result in quickly wearing out the bearing, decreased load capacity and susceptible to seizure.

Accordingly, there is need for a new and improved epicyclical gearbox including a journal bearing, in which lubrication of the component parts, and in particular an improved flow of hydrodynamic oil is provided within the bearing in an attempt to minimize or eliminate wear and tear on the gearbox bearings.

BRIEF DESCRIPTION

The present application is directed to an embodiment of a journal bearing for use in an epicyclical gearbox. The journal bearing including a journal bearing body, a journal pin and at least one lubricating fluid inlet. The journal bearing body having a fixed arc shaped and subject to deformation under a high pressure event. The journal pin is disposed in the journal bearing body. The at least one lubricating fluid inlet is configured to provide for an input of a lubricating fluid in a loaded arc portion proximate at least one high pressure point exerted upon the journal bearing body during a high pressure event, thereby permitting a free flow of a lubricating fluid there between the journal pin and the journal bearing body during the high pressure event.

The present application is further directed toward another embodiment of an epicyclical gearbox. The gearbox including a sun gear, a plurality of planet gears positioned about the sun gear and in meshing relationship therewith and a plurality of journal bearings. The journal bearings each rotatably support one of the plurality of planet gears. Each of the plurality of journal bearings is configured to include a journal bearing body, a journal pin, a planet carrier and at least one lubricating fluid inlet. The journal bearing body is configured having a fixed arc shape and subject to deformation under a high pressure event. The journal pin is disposed at least partially within the journal bearing body. The planet carrier is configured in fixed relationship with each of the plurality of journal pins. The at least one lubricating fluid inlet of each of the plurality of journal bearings is configured to provide for an input of a lubricating fluid in a loaded arc portion of the journal bearing body, proximate a high pressure point exerted upon the journal bearing body during a high pressure event, thereby permitting a free flow of a lubricating fluid there between the journal pin and the journal bearing body during the high pressure event.

The present application further provides a method of facilitating a hydrodynamic oil flow in a planet gear journal bearing. The method including providing a fixed arc journal bearing body; disposing a journal pin proximate the fixed arc journal bearing body; and providing an input lubricating fluid flow within the fixed arc journal bearing body at an lubricating fluid inlet, the lubricating fluid inlet configured to provide for the input of a lubricating fluid in a loaded arc portion of the journal bearing body, proximate a high pressure point exerted upon the journal bearing body during a high pressure event, thereby permitting a free flow of a lubricating fluid there between the journal pin and the journal bearing body during the high pressure event.

These and other features and improvements of the present application will become apparent to one of ordinary skill in the art upon review of the following detailed description when taken in conjunction with the several drawings and the appended claims.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

In a properly designed journal bearing system, friction between the journal pin and the journal bearing body is minimized via fluid dynamic effects, thereby minimizing, if not eliminating surface-to-surface contact between the journal pin and the journal bearing body. In a hydrodynamic bearing, such as the epicyclical star-type gear bearing described herein, the pressure in the lubricating fluid film is maintained by the rotation of the journal bearing body relative to the journal pin. The fluid lubrication results in a full-film or a boundary condition lubrication between the journal pin and the journal bearing body. Typically, this type of bearing system is more susceptible to wear because lubrication does not occur until there is a rotational effect between the journal pin and the journal bearing body. At low rotational speeds the lubrication may not attain complete separation between the journal pin and the journal bearing body. Under hydrodynamic conditions, or under high rotational speeds, a lubrication "wedge" forms that lifts the journal pin away from the journal bearing body. The journal bearing body or journal pin also slightly shifts relative to one another horizontally in a direction of rotation. Under the influence of a pinching pressure, as described herein, the lubrication "wedge" cannot form, causing the lubricating fluid flow to "whirl" around the journal bearing body and exit the journal bearing body. This results in a lack of lubrication within the bearing that may result in direct contact between the journal pin and the journal bearing body. This direct contact may result in quickly wearing out the bearing or complete seizure of the bearing.

Figure 1:
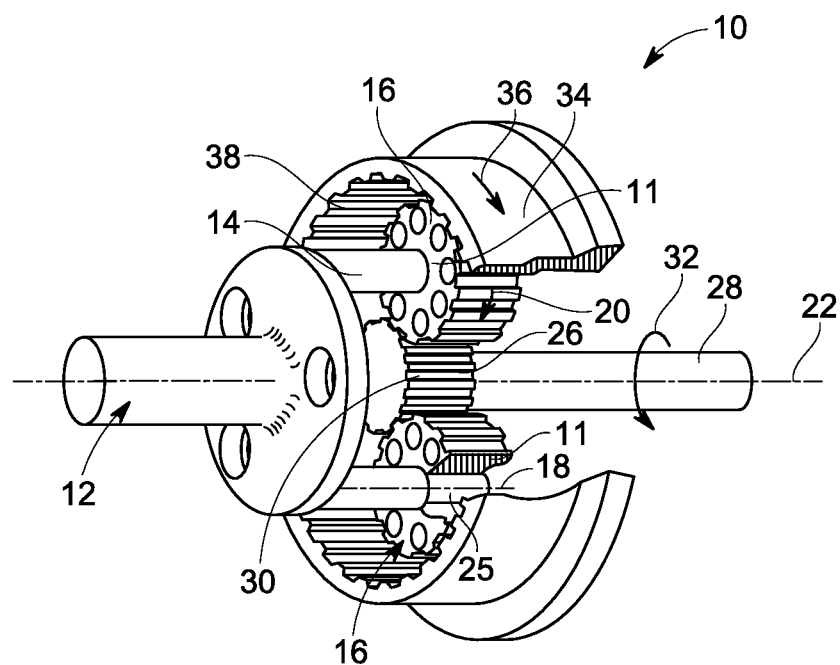
FIG. 1 is a partial cut-away illustration of a gearbox including a journal bearing according to an embodiment as may be described herein.

Referring now to the drawings, in which like numerals refer to like elements through out the several views, illustrated in FIG. 1 is a partial cut-away view of a gearbox 10 including a lubricating fluid inlet configured to provide for an input of a pressurized lubricating fluid in a loaded arc portion of the journal bearing (described presently). In an embodiment, the pressurized lubricating fluid is input at the fluid flow inlet at a pressure greater than ambient pressure. The gearbox 10 is typically housed within a gearbox housing (not shown). The gearbox housing extends around and supports a planet carrier 12 in a fixed position relative to the housing. The planet carrier 12, and more particularly a plurality of journal bearings 11, each including a fixed journal pin 14 and a journal bearing body 25, is configured to support a plurality of planet gears 16 for orbital movement about a central axis 18 of each planet gear 16. The number of planet gears 16 is equal to the number of fixed journal pins 14. In the illustrated embodiment, therefore, two planet gears 16 are provided, although any number of planet gears may be included. The planet gears 16 are configured substantially larger in diameter than the fixed journal pins 14. Each one of the planet gears 16 has a plurality of external gear teeth 20 which, in the illustrated embodiment, are spur gear teeth.

In the illustrated embodiment, the two fixed journal pins 14 are provided spaced apart equally about a central axis 22 of the gear 10. A plurality of sliding type or roller type bearing bodies support the fixed journal pins 14 for rotation relative to the planet gears 16. In the illustrated embodiment, the bearings 24 are configured as journal bearings. Specifically, the journal bearing body 25 is mounted proximate an end portion of the planet carrier 12, and more particularly the fixed journal pins 14, thereby engaging and supporting a first end of each journal pin 14 and supporting that end of the fixed journal pins 14 directly from the planet carrier 12.

The gearbox 10 also includes a single sun gear 26 mounted within the planet carrier 12, surrounded by the planet gears 16, and having formed as a part thereof a sun gear shaft 28. The sun gear 26 is radially supported by contact with the surrounding planet gears 16, for rotation of the sun gear 26, relative to the gearbox housing, about the central axis 22. The sun gear 26 may include a hollow bore (not shown) along its axis 22, and along the axis of a shaft extension (not shown) to conduct control wiring (not shown) through the gearbox 10. The sun gear 26 is configured substantially smaller in diameter than the planet gears 16.

The sun gear 26 has a plurality of external spur or helical gear teeth 30 that are in meshing engagement with the external gear teeth 20 on the planet gears 16. As a result, rotation of the sun gear shaft 28 about the axis 22, in response to an input rotational drive force 32 provided by an external device, causes the sun gear 26 to rotate about the central axis 22. The input rotational drive force 32 is thus entirely transmitted through the sun gear 26 to the planet gears 16, driving the planet gears 16 to each rotate about their central axes 18.

The gearbox 10 further includes a ring gear 34. The ring gear 34 is typically coupled to an external device (not shown), in a suitable manner, whereby the ring gear 34 is configured to exert a rotational output torque 36 thereon an external device (not shown). The ring gear 34 receives the input rotational drive force 32 from the sun gear shaft 28 that is translated via the sun gear 26 to rotate the planet gears 16 relative to the ring gear 34 in response to the input rotational drive force 32.

Figure 2:
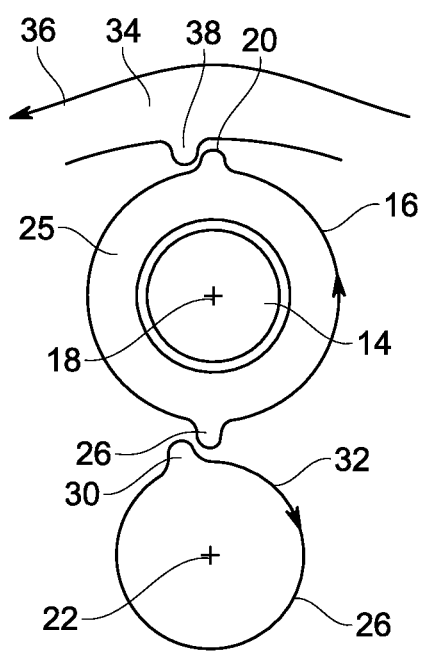
FIG. 2 is an end view of a portion of the gearbox of FIG. 1 illustrating the journal bearing and rotational forces according to an embodiment as may be described herein.

The ring gear 34 is configured to include an array of internal spur or helical gear teeth 38. The internal gear teeth 38 on the ring gear 34 are configured in meshing engagement with the plurality of external gear teeth 20 on each of the planet gears 16. As best illustrated in FIG. 2, orbital movement of the planet gears 16 (of which only one is illustrated in FIG. 2) about their own central axis 18 (as indicated by the directional arrow), in response to rotation of the sun gear shaft 28 and sun gear 26 about the central axis 22 (as indicated by the directional arrow), causes the ring gear 34 to rotate relative to the planet carrier 12 (as indicated by the directional arrow). The input rotational drive force 32 transmitted from the external device to the sun gear shaft 28 is thus transmitted entirely to the ring gear 34 as the rotational output torque 36.

Referring again to both FIGS. 1 and 2, during operation, input torque, and more particularly the input rotational drive force 32 is transmitted to the sun gear 26 and then split among the two planet gears 16 (of which only one is illustrated in FIG. 2) and thus among the two journal bearings 11, including the two bearing bodies 25 and the two journal pins 14, for transmission to the ring gear 34 as the rotational output torque 36. This configuration spreads the high torque provided by the sun gear 26 among the planet gears 16. An input lubricating fluid (not shown), such as a lubricating oil, is supplied to lubricate the journal bearings 25. During operation, as the input rotational drive force 32, thus input torque, is applied to the sun gear 26, in a star configuration, the fixed journal pins 14 are stationary, while the planet gears 16 rotate about their own centers 18. In addition, the ring gear 34 will rotate opposite the rotation of the sun gear 26.

Figure 3:
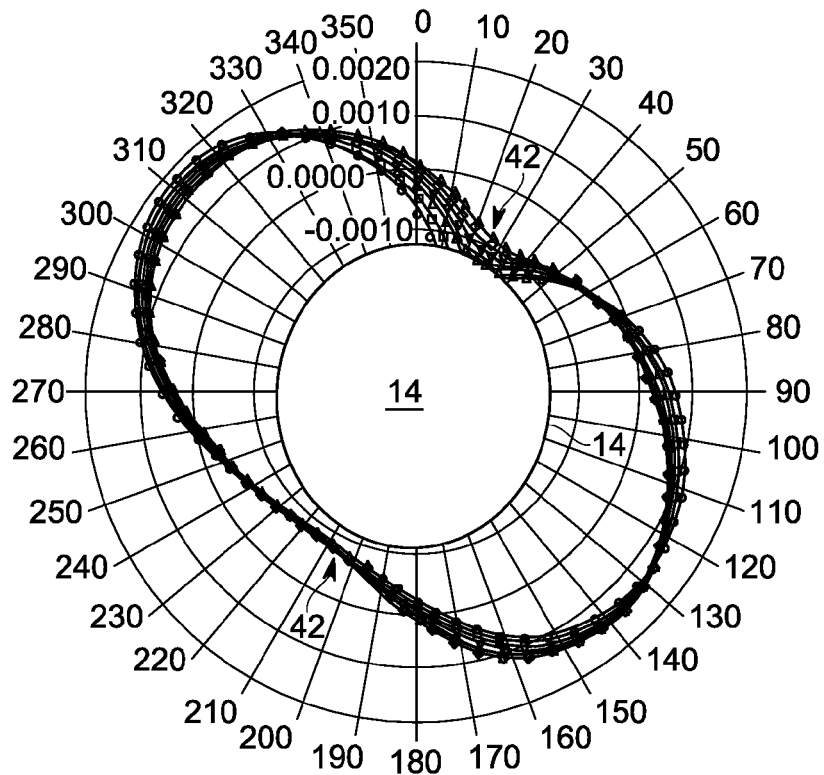
FIG. 3 is a graphical representation of an end view of the planetary gear of FIG. 1 illustrating a journal pinching profile according to an embodiment as may be described herein.

As best illustrated in FIG. 3, in a combined graphical pinching profile and schematic of an end view of a journal bearing body 25 of FIG. 1, the combination of the input rotational drive force 32 (at the sun gear 26) and the rotational output force 36, thus output torque, at the ring gear 34 may result in a deformation of each of the planet gears 16, and more particularly each of the bearing bodies 25, pinching the associated journal pin 14 at a plurality of points 42. Depending upon a rim thickness of each of the planet gears 16, the clearance between each of the journal pin's 14 outside diameter (OD) and the associated bearing bodies 25 inside diameter (ID) and thus planet gear 16 can become completely closed. This closure may potentially prevent the lubricating oil flow from reaching the highly loaded portion of each of the plurality of bearings 24. Instead of lubricating all portions of the journal bearings 24, and thus the planet gears 16, the lubricating oil flow will exit through the side of each of the planet gears 16 before reaching the loaded arc portion of each of the gears.

Figure 4:
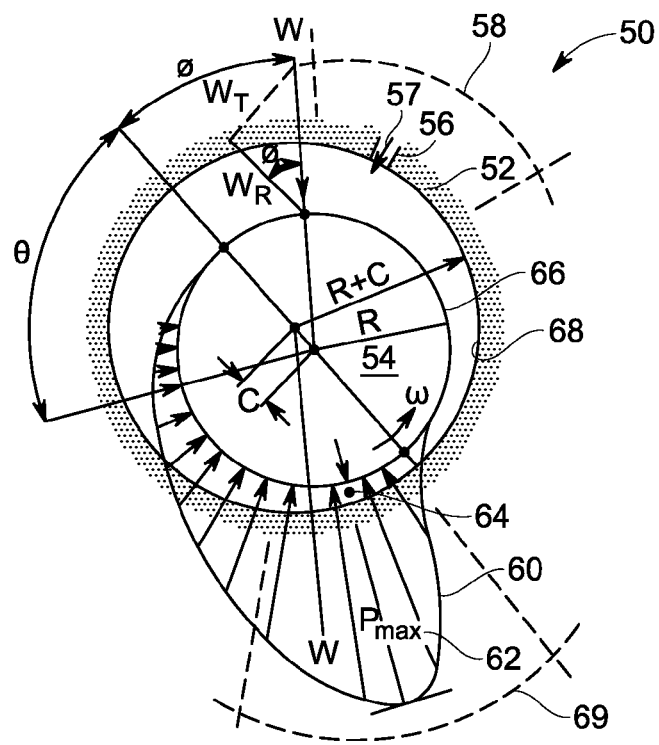
FIG. 4 is a graphical representation of an end view of a prior art planetary gear and journal bearing illustrating a typical bearing clearance and pressure profile as may be described herein.
Figure 5:
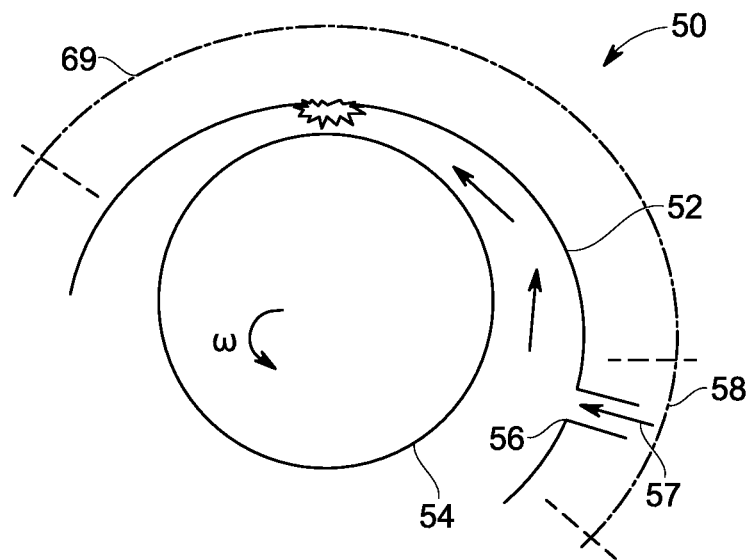
FIG. 5 is a schematic representation of an end view of a portion of a prior art journal bearing illustrating a pinching profile under non-loaded gear operating conditions as may be described herein.

Referring now to FIGS. 4 and 5, illustrated are end views of a single planet gear known in the art showing bearing clearance and pinching profiles. FIG. 4 illustrates the bearing clearance and pinching profiles in a combined schematic and graphical view. FIG. 5 illustrates the bearing clearance and pinching profiles in a simplified schematic view. More particularly, illustrated is a portion of a known epicyclical gear 50, and more particularly, a bearing comprising a journal bearing body 52 and a journal pin 54. The journal bearing body 52 has formed therein a lubricant supply opening 56, through which a lubricating fluid flow 57 is introduced into an interior of the journal bearing body 52. The lubricant supply opening 56 is generally configured as an axial extending opening into which the lubricant supply fluid flow 57 is input. In an embodiment, the lubricant supply opening 56 is positioned on an unloaded arc portion 58 of the journal bearing body 52 as illustrated. As schematically illustrated in FIG. 4, during operation of gear 50, a circumferential pressure distribution profile 60 changes in light of forces exerted upon an associated planet gear (not shown) and thus the journal bearing body 52. More particularly, as illustrated, a maximum pressure ($P_{max}$) 62 is reached at a point 64 where a distance between an outside diameter (OD) 66 of the journal pin 54 is nearest an inside diameter (ID) 68 of the journal bearing body 52. The formation of the high pressure point 64 is due to the deformation of the journal bearing body 52 as a result of forces exerted thereupon. Due to this minimum distance between the journal bearing body 52 and journal pin 54, as well as the distance between the lubricant supply opening 56 and the high pressure point 64, the lubricating fluid 57 is not able to flow beyond point 64 and lubricate the gear 50. More specifically, the lubricating fluid 57 is blocked before reaching a loaded arc portion 69 (FIG. 4) proximate the high pressure point 64 of each of the gears. As a result, the gear 50 is subject to wear, decreased load capacity and susceptible to seizure.

Figure 6:
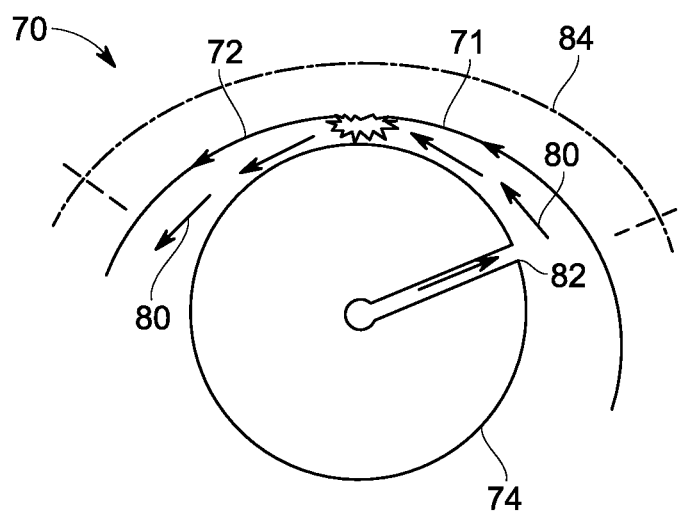
FIG. 6 is a schematic representation of an end view of a portion of an embodiment of the journal bearing of FIG. 1 under non-loaded gear operating conditions including an improved fluid inlet according to an embodiment as may be described herein.
Figure 7:
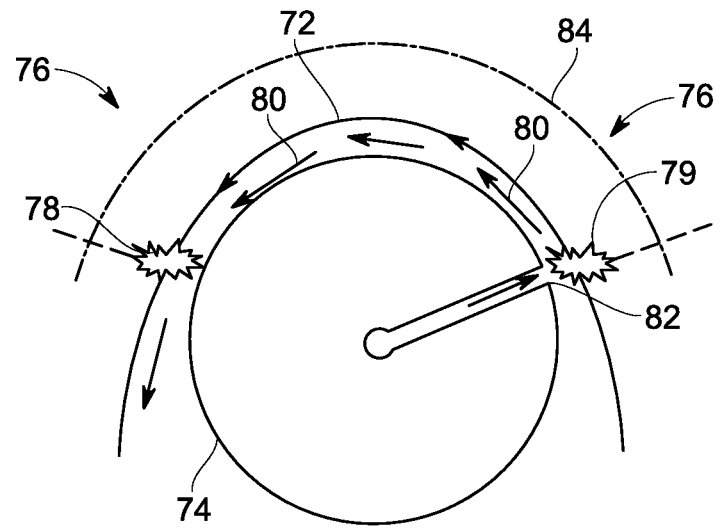
FIG. 7 is a schematic representation of an end view of a portion of an embodiment of the journal bearing of FIG. 1 under loaded gear operating conditions and including an improved fluid inlet according to an embodiment as may be described herein.

Referring now to FIGS. 6-11, illustrated are alternate embodiments of a journal bearing assembly for use in an epicyclical gear, such as gear 10 of FIG. 1 and method of facilitating hydrodynamic oil flow in the journal bearing. Illustrated is a plurality of bearing assemblies, each including a journal bearing body and a modified lubricating fluid inlet that permits a free flow of lubricating fluid flow there between the journal bearing body and the journal pin. Referring now to FIGS. 6 and 7, illustrated is a schematic end view of a portion of an embodiment of the journal bearing of FIG. 1. More particularly, illustrated in FIG. 6 is a planet bore and pinching profile under non-loaded gear operating conditions and including an improved lubricating fluid inlet according to an embodiment as may be described herein. Illustrated in FIG. 7 is a schematic representation of an end view of a portion of an embodiment of the journal bearing of FIG. 1 illustrating a deformed planet bore and pinching profile under loaded gear operating conditions and including an improved fluid inlet according to an embodiment as may be described herein.

Illustrated in FIGS. 6 and 7 is a portion of the gearbox 70, including a journal bearing 71 comprised of the journal bearing body 72 and a journal pin 74 at least partially disposed therein, and generally configured as a cylindrical fixed arc journal bearing. In the illustrated embodiment, the journal bearing body 72 is under the influence of an input rotational drive force, or torque, and thus exhibits radial deflection in the form of a deformation 76 at a plurality of points, or areas, 78 and 79, as best illustrated in FIG. 7 when operating under a loaded condition. It is noted that an increase in pressure exerted upon the journal bearing body 72 and the journal pin 74 is noted at a plurality of axial locations, and specifically at points 78 and 79. As best illustrated in FIG. 6, during a non-loaded operating condition, a lubricating fluid flow 80 is present between the journal bearing body 72 and the journal pin 74. As depicted, to aid in the presence of the lubricating fluid flow 80, the journal pin 74 includes a lubricating fluid flow inlet 82 configured to provide for an input of the lubricating fluid 80 in a loaded arc portion 84 (as best illustrated in FIG. 7) proximate a known high pressure point exerted upon the journal bearing body during a high pressure event. As previously stated, the high pressure points are indicated at points 78 and 79. The positioning of the lubricating fluid inlet 82 within this loaded arc portion 84 better enables a free flow of the lubricating fluid 80 there between the journal pin 74 and the journal bearing body 72 during the high pressure event. Typically, and as previously described with reference to FIGS. 4 and 5, lubrication admission into a bearing starts at the leading edge of the arc in the direction of rotation. By circumferentially shifting the lubricating fluid inlet 82 to the loaded arc portion 84 as illustrated in FIGS. 6 and 7, the actual arc length of the bearing body 72 is shortened, thereby also changing a location of the arc center.

Figure 8:
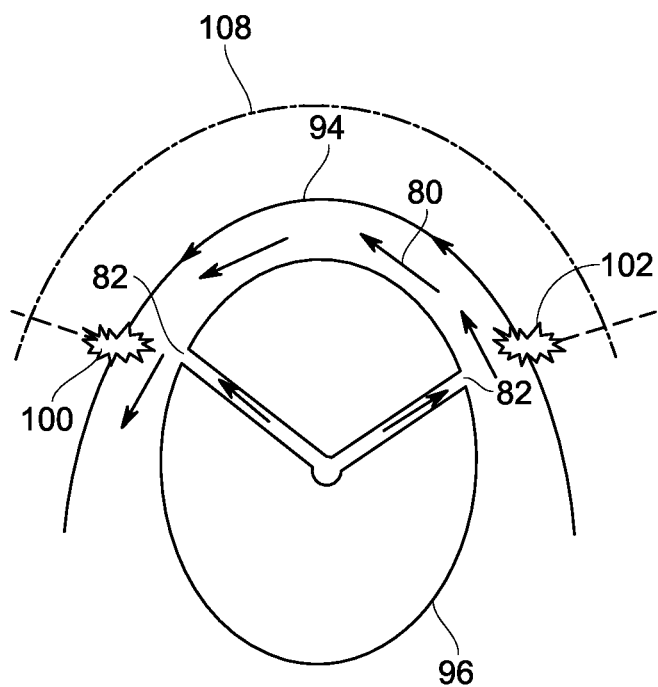
FIG. 8 is a schematic representation of an end view of a portion of another embodiment of a journal bearing under loaded gear operating conditions and including an improved fluid inlet and non-circular planet pin according to an embodiment as may be described herein.
Figure 9:
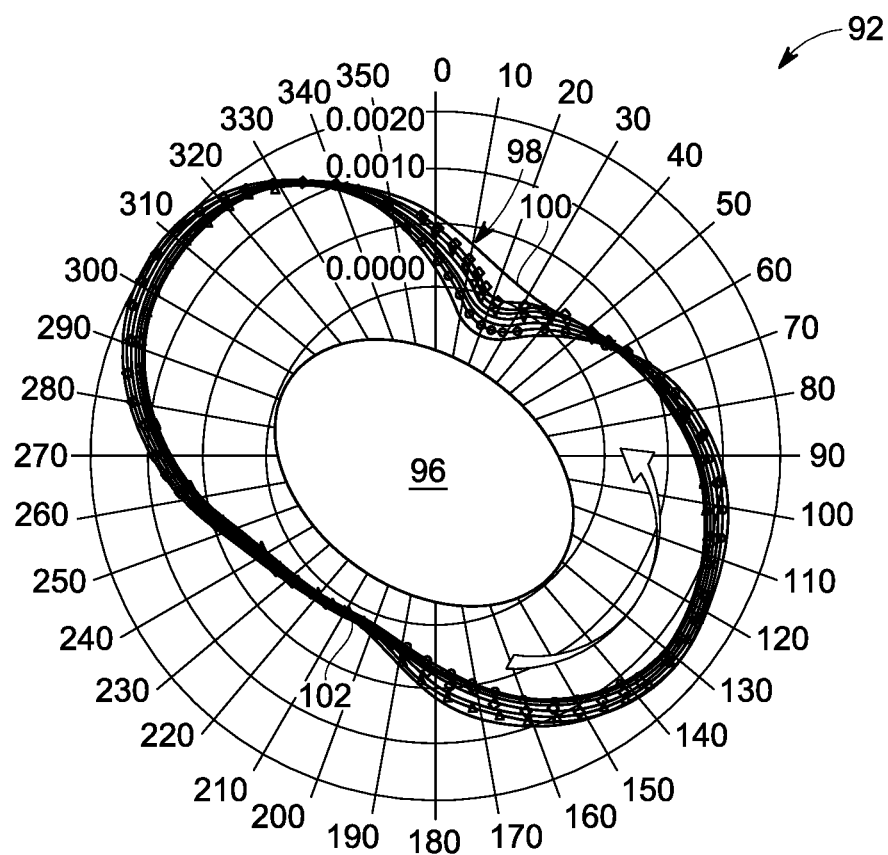
FIG. 9 is a graphical representation of an end view of a journal bearing illustrating a non-circular planet pin and an associated pinching profile according to another embodiment as may be described herein.

Referring now to FIGS. 8 and 9, illustrated is a schematic cross sectional view of a portion of a gearbox 90, taken through a journal bearing 92, and more particularly taken through a journal bearing body 94 and a modified journal pin 96, such as journal bearing 11 of FIG. 1, under a highly-loaded operating condition. More specifically, illustrated is a portion of the gearbox 90, including the journal bearing 92 comprised of the journal bearing body 94 and a non-circular journal pin 96, generally configured as a cylindrical fixed arc journal bearing. In the illustrated embodiment, the journal bearing body 94 is under the influence of an input rotational drive force, or torque, and thus exhibits radial deflection in the form of a deformation 98 at a plurality of high pressure points, or areas, 100 and 102. Similar to the previous embodiment, it is noted that an increase in pressure exerted upon the journal bearing body 94 and the non-circular journal pin 96 is indicated at a plurality of axial locations, and specifically at points 102 and 104. To aid in the presence of a lubricating fluid flow 104, the journal pin 96 includes a plurality of lubricating fluid flow inlets 106 configured to provide for an input of the lubricating fluid 104 in a loaded arc portion 108 (as best illustrated in FIG. 8) proximate the plurality of high pressure points 102 and 104 exerted upon the journal bearing body 94 during a high pressure event. The positioning of the lubricating fluid inlets 106, each within the loaded arc portion 108 better enables a free flow of the lubricating fluid 104 there between the non-circular journal pin 96 and the journal bearing body 94 during the high pressure event. As previously described by circumferentially shifting each of the lubricating fluid inlets 106 to the loaded arc portion 108, the actual arc length of the bearing body 94 is shortened, thereby also changing a location of the arc center.

In the embodiment illustrated in FIGS. 8 and 9, in addition to providing a plurality of circumferentially shifted lubricating fluid inlets 106, the non-circular journal pin 96 is a modified journal pin, being modified to permit a flow of the lubricating fluid flow 104 between the journal bearing body 94 and the non-circular journal pin 96. In that the non-circular journal pin 96 is fixed and does not rotate, the high pressure, or loaded arc of the journal bearing body 94 is limited to a specific area of the shaft diameter. More specifically, in the illustrated embodiment, the non-circular journal pin 96 is configured having a generally non-circular geometry, thus creating sufficient clearance to allow the lubricating fluid flow 104 to flow sufficiently to lubricate the planet gear, or the journal bearing body 94 inside diameter (ID) at the high pressure points 102 and 104. The non-circular journal pin 96 is configured to substantially mimic the fixed-arc type bearing 92 and simulate the same hydrodynamic behavior of the bearing 92. It should be understood that various fixed arc bearings are well known in the art, including a full bearing or cylindrical journal bearing, an elliptical, or lemon shaped bearing, an offset bearing, a pressure dam bearing, a multi-lobe bearing, such as a three-lobe bearing, a four-lobe bearing, etc., and a tilting or pivoted-pad bearing. It is anticipated that the described modified non-circular journal pin may be incorporated into any such type of journal bearing assembly and configured to substantially mimic the bearing into which it is disposed.

Figure 10:
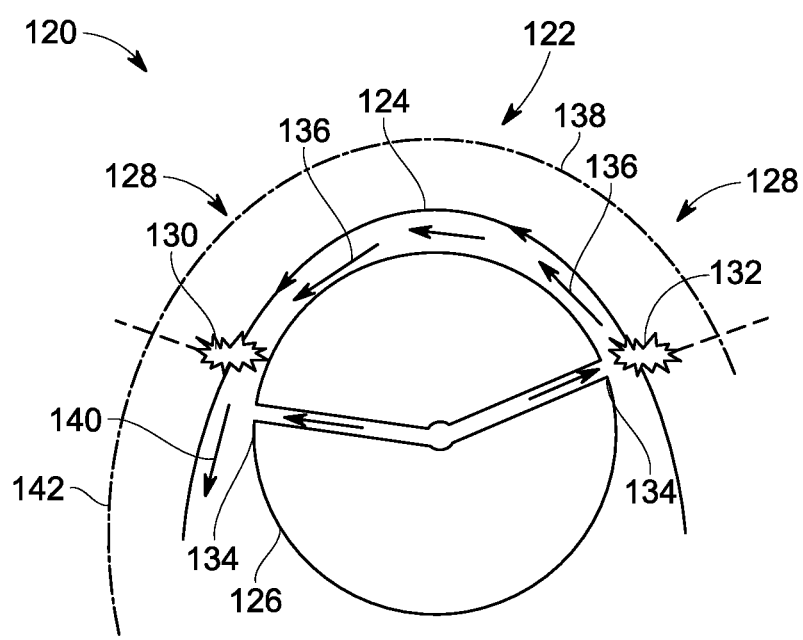
FIG. 10 is a is a schematic representation of an end view of a portion of another embodiment of a journal bearing under loaded gear operating conditions and including an improved fluid inlet according to an embodiment as may be described herein.

As best illustrated in FIG. 10, in an alternative embodiment, disclosed is a gearbox 120 including the journal bearing 122 comprised of the journal bearing body 124 and journal pin 126, generally configured as a cylindrical fixed arc journal bearing. In the illustrated embodiment, the journal bearing body 124 is under the influence of an input rotational drive force, or torque, and thus exhibits radial deflection in the form of a deformation 128 at a plurality of high pressure points, or areas, 130 and 132. The journal pin 126 includes a plurality of fluid flow inlets 134 configured to provide for an input of a lubricating fluid 136 in a loaded arc portion 138 proximate the high pressure point 132 exerted upon the journal bearing body 124 during a high pressure event and a cooling fluid flow 140 in a non-loaded arc portion 142 to further aid in cooling of the journal bearing 122. The positioning of the lubricating fluid inlets 134, one within the loaded arc portion 138 and one within the non-loaded arc portion 142 better enables a free flow of the lubricating fluid 104 there between the non-circular journal pin 96 and the journal bearing body 94 during the high pressure event and further provides cooling to the journal bearing 122. As previously described by circumferentially shifting at least one of the lubricating fluid inlets 134 to the loaded arc portion 108, the actual arc length of the bearing body 124 is shortened, thereby also changes a location of the arc center.

Figure 11:
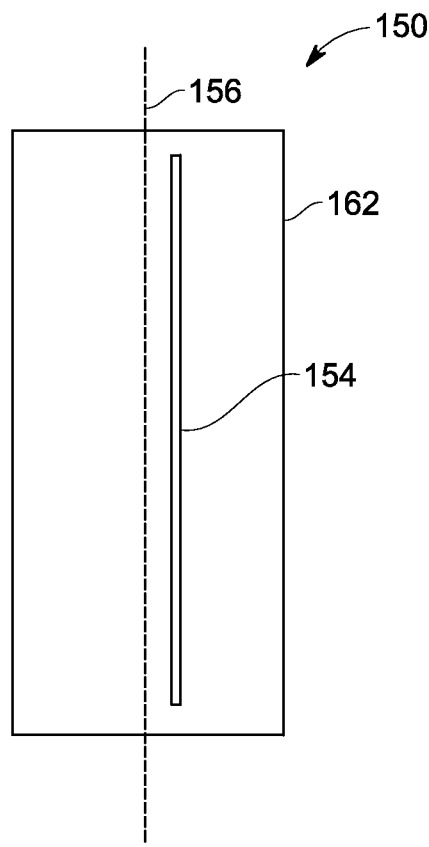
FIG. 11 is a simplified schematic of an exterior of a journal pin according to an embodiment as may be described herein.
Figure 12:
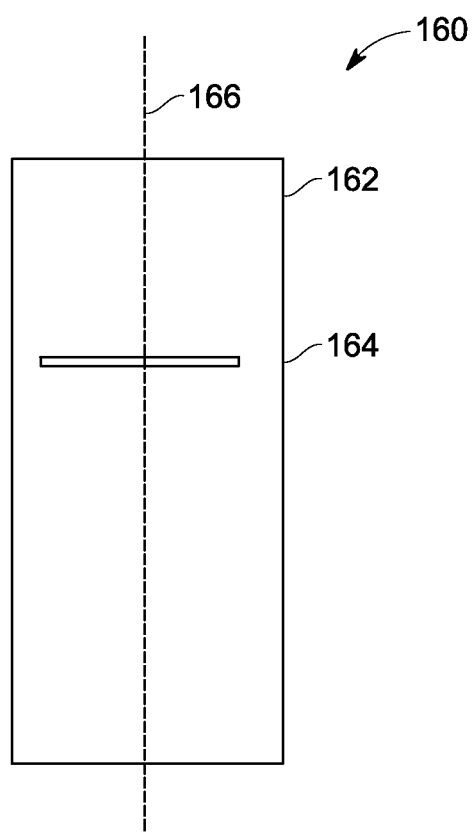
FIG. 12 is a simplified schematic of an exterior of an another embodiment of a journal pin according to an embodiment as may be described herein.

Referring now to FIGS. 11 and 12, illustrated are simplified schematics of an exterior of an embodiment of a journal pin 152, generally similar to the journal pin 14 of FIG. 1. More specifically, illustrated in FIG. 11, is a portion of a journal bearing 150, comprising the journal pin 152, including an axially extending lubricating fluid inlet 154 for the input of a lubricating fluid. In the illustrated embodiment, a lubricating fluid (not shown) is input into the journal pin 152 substantially parallel to an axis 126 of the journal pin 152 and at a loaded arc portion (as previously described) proximate a high pressure point exerted upon the journal pin 152 during a high pressure event. In the illustrated embodiment, the axially input of the lubricating fluid provides a continual flow of lubricating fluid between the journal bearing journal pin 152 and the journal bearing body (not shown).

In an alternate embodiment, illustrated in FIG. 12, illustrated is a portion of a journal bearing 160, comprising a journal pin 162, including a circumferentially extending lubricating fluid inlet 164 for the input of a lubricating fluid. In contrast to the previous embodiment, in the illustrated embodiment of FIG. 12, a lubricating fluid (not shown) is input into the journal pin 162 substantially perpendicular to an axis 156 of the journal body 152. More specifically, the lubricating fluid inlet 164 is configured circumferentially extending about a portion of the journal pin 162, and more particularly about a loaded arc portion (as previously described) proximate a high pressure point exerted upon the journal pin 162 during a high pressure event. In the illustrated embodiment, the circumferential configuration of the lubricating fluid provides a continually flow of lubricating fluid between the journal pin 162 and the journal bearing body (not shown).

Figure 13:
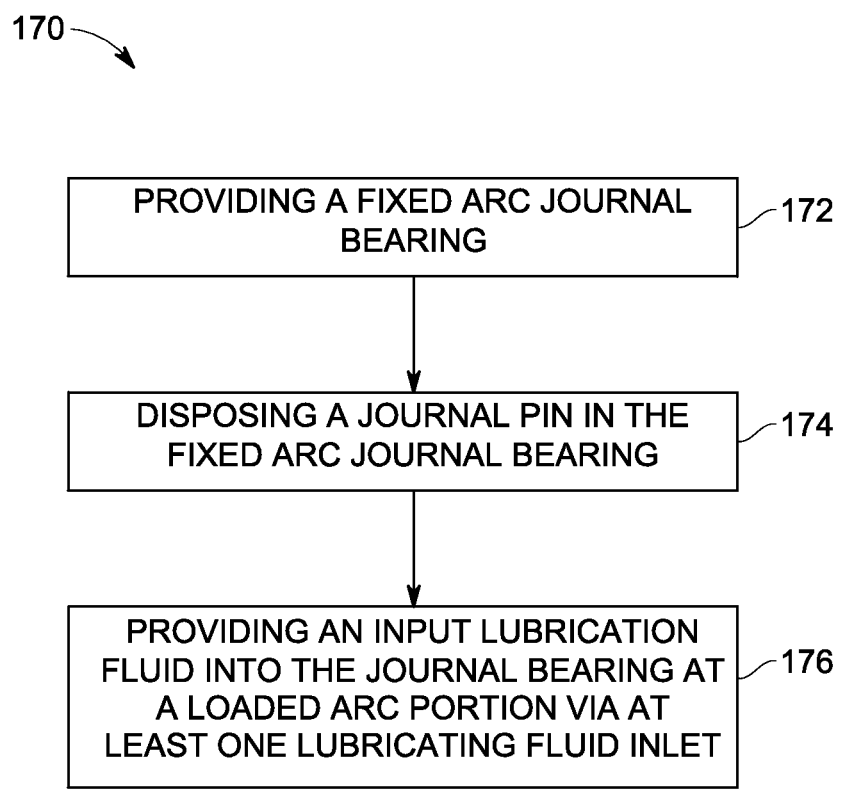
FIG. 13 is a block diagram of a method of facilitating a hydrodynamic oil flow in a planet gear journal bearing in accordance with one or more embodiments shown or described herein.

Referring now to FIG. 13, illustrated is a method of facilitating a hydrodynamic oil flow in a planet gear journal bearing in accordance with one or more embodiments shown or described herein. The method, generally referenced 170, includes an initial step, 172, of providing a fixed arc journal bearing body. A journal pin is disposed, at step 174, at least partially within the fixed arc journal bearing body. Next, an input lubricating fluid flow is provided, at step 176, within the fixed arc journal bearing body at at least one lubricating fluid inlet. The lubricating fluid inlet is configured to provide for the input of a lubricating fluid in a loaded arc portion of the journal bearing body, proximate at least one high pressure point exerted upon the journal bearing body during a high pressure event. The input of the lubricating fluid at the loaded arc portion permits a free flow of a lubricating fluid there between the journal pin and the journal bearing body during the high pressure event.

Accordingly, provided is an epicyclical gearbox including a journal pin disposed at least partially in a journal bearing and a lubricating fluid inlet, wherein the lubricating fluid inlet is configured to provide for an input of a lubricating fluid in a loaded arc portion proximate a high pressure point exerted upon the journal bearing body during a high pressure event, thereby permitting a free flow of a lubricating fluid there between the journal pin and the journal bearing body during the high pressure event. The lubricating fluid inlet may be configured axially or circumferentially extending about the journal bearing body. In addition, to further provide for the flow of a lubricating fluid between the journal pin and the journal bearing body, the journal pin may be non-circular in geometry and configured to mimic the shape of the journal bearing body structure and permit the free flow of a lubricating fluid between the non-circular journal pin and the journal bearing body. The free flow of the lubricating fluid between the journal pin and the journal body provides sufficient lubrication to the journal bearing body and the associated planet gear. The novel journal bearing design disclosed herein facilitates hydrodynamic oil flow, increased bearing load capacity and optimization of bearing performance.

While the disclosure has been described with reference to a plurality of exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A journal bearing for use in an epicyclical gearbox, the journal bearing, comprising:
a journal bearing body having a fixed arc shaped and subject to deformation under a high pressure event;
a journal pin disposed in the journal bearing body; and
at least one lubricating fluid inlet,
wherein the fluid inlet is configured to provide for an input of a lubricating fluid in a loaded arc portion proximate at least one high pressure point exerted upon the journal bearing body during a high pressure event, thereby permitting a free flow of a lubricating fluid there between the journal pin and the journal bearing body during the high pressure event.

2. The journal bearing of claim 1, wherein the high pressure event is in response to a rotational drive force imparted on the journal bearing body.

3. The journal bearing of claim 1, wherein the journal pin comprises a non-circular journal pin configured to mimic the fixed arc shape of each journal bearing body thereby permitting a free flow of a lubricating fluid there between during the high pressure event.

4. The journal bearing of claim 1, wherein the lubricating fluid inlet is configured axially extending relative to the journal pin and proximate a high pressure point exerted upon the journal pin.

5. The journal bearing of claim 1, wherein the lubricating fluid inlet is configured circumferentially extending about a portion of the journal pin and proximate a high pressure point exerted upon the journal pin.

6. The journal bearing of claim 1, further comprising a cooling fluid inlet configured to provide for an input of a cooling fluid proximate a non-loaded arc portion of the journal bearing.

7. The journal bearing of claim 1, wherein the journal bearing body includes a first high pressure point and a second high pressure point.

8. The journal bearing of claim 7, further comprising a first lubricating fluid inlet configured to provide for an input of a lubricating fluid in a loaded arc portion proximate the first high pressure point exerted upon the journal bearing body during a high pressure event.

9. The journal bearing of claim 7, further comprising a second lubricating fluid inlet configured to provide for an input of a lubricating fluid in a loaded arc portion proximate the second high pressure point exerted upon the journal bearing body during a high pressure event.

10. An epicyclical gearbox, comprising:
a sun gear;
a plurality of planet gears positioned about the sun gear and in meshing relationship therewith;
a plurality of journal bearings, each rotatably supporting one of the plurality of planet gears, each of the plurality of journal bearings configured to include a journal bearing body having a fixed arc shape and subject to deformation under a high pressure event, a journal pin disposed at least partially within the journal bearing body, and at least one lubricating fluid inlet; and
a planet carrier configured in fixed relationship with each of the plurality of journal pins,
wherein the at least one lubricating fluid inlet of each of the plurality of journal bearings is configured to provide for an input of a lubricating fluid in a loaded arc portion of the journal bearing body, proximate a high pressure point exerted upon the journal bearing body during a high pressure event, thereby permitting a free flow of a lubricating fluid there between the journal pin and the journal bearing body during the high pressure event.

11. The epicyclical gearbox of claim 10, wherein the high pressure event is in response to a rotational drive force imparted on the journal bearing body.

12. The epicyclical gearbox of claim 10, wherein the journal pin comprises a non-circular journal pin configured to mimic the fixed arc shape of the journal bearing body thereby permitting a free flow of a lubricating fluid there between during the high pressure event.

13. The epicyclical gearbox of claim 10, wherein the at least one lubricating fluid inlet is configured axially extending relative to the journal pin and proximate a high pressure point exerted upon the journal pin.

14. The epicyclical gearbox of claim 10, wherein the at least one lubricating fluid inlet is configured circumferentially extending about a portion of the journal pin and proximate a high pressure point exerted upon the journal pin.

15. The epicyclical gearbox of claim 10, further comprising an additional fluid inlet configured to provide for an input of a cooling fluid proximate a non-loaded arc portion of the journal bearing.

16. The epicyclical gearbox of claim 10, wherein the journal bearing body includes a first high pressure point and a second high pressure point.

17. The epicyclical gearbox of claim 16, further comprising a first lubricating fluid inlet configured to provide for an input of a lubricating fluid in a loaded arc portion proximate the first high pressure point exerted upon the journal bearing body during a high pressure event and a second lubricating fluid inlet configured to provide for an input of a lubricating fluid in a loaded arc portion proximate the second high pressure point exerted upon the journal bearing body during a high pressure event.

18. A method of facilitating a hydrodynamic oil flow in a planet gear journal bearing, the method comprising:
providing a fixed arc journal bearing body;
disposing a journal pin proximate the fixed arc journal bearing body; and
providing an input lubricating fluid flow within the fixed arc journal bearing body at an lubricating fluid inlet, the lubricating fluid inlet configured to provide for the input of a lubricating fluid in a loaded arc portion of the journal bearing body, proximate a high pressure point exerted upon the journal bearing body during a high pressure event, thereby permitting a free flow of a lubricating fluid there between the journal pin and the journal bearing body during the high pressure event.

19. The method of claim 18, wherein the high pressure event is in response to a rotational drive force imparted on the fixed arc journal bearing body.

20. The method of claim 18, wherein the journal pin comprises a non-circular journal pin configured to mimic the fixed arc shape of each journal bearing body thereby permitting a free flow of a lubricating fluid there between during the high pressure event.

* * * * *